INVENTORS
KYOJI TACHIKAWA
YOSHIAKI TANAKA
SATOSHI FUKUDA

BY Woodhams, Blanchard Flynn
ATTORNEYS

United States Patent Office 3,674,553
Patented July 4, 1972

3,674,553
SUPERCONDUCTOR AND ITS MANUFACTURING METHOD
Kyoji Tachikawa, Yoshiaki Tanaka, and Satoshi Fukuda, Tokyo, Japan, assignors to Director of National Research Institute for Metals, Tokyo, Japan
Original application June 19, 1967, Ser. No. 646,820. Divided and this application June 1, 1970, Ser. No. 54,049
Claims priority, application Japan, June 25, 1966, 41/41,040
Int. Cl. B44d 1/18
U.S. Cl. 117—217                                   5 Claims

ABSTRACT OF THE DISCLOSURE

A superconductor consisting of a vanadium substrate of wire or tape form and an overlying layer of superconductive $V_3Ga$ intermetallic compound. A method for manufacturing such superconductor, comprising the steps of forming a layer of intermediate compounds richer in gallium on the surface of a vanadium substrate having said form through a reaction between the vanadium substrate and the surrounding molten gallium at a temperature between 500° C. and 800° C., and of converting said phase to $V_3Ga$ at a temperature between 600° C. and 850° C. An apparatus best suited for practicing said method in the manufacture of such superconductor.

CROSS REFERENCE TO A RELATED APPLICATION

This application is a division of our co-pending application, Ser. No. 646,820, filed June 19, 1967, now Pat. No. 3,574,573.

BACKGROUND OF THE INVENTION (a) Field of the invention

The present invention relates to a superconductor consisting of a vanadium substrate having, on the surface thereof, a layer of $V_3Ga$ intermetallic compound having superconductive characteristics optimum for the superconductor to be used as a superconducting magnet wire, and also concerns a method for manufacturing such superconductor, and further pertains to an apparatus best suited for the application of the aforesaid manufacturing method to practice.

(b) Description of the prior art

With the recent development of a wider utility of superconducting magnets, such as in solid state physics, nuclear physics, electron microscopes and magnetohydrodynamic power generator (MHD power generators), superconducting materials for use in magnet wires have become indispensable in science and technology. Among the superconducting materials which have hitherto been known, niobium-zirconium alloys, niobium-titanium alloys and $Nb_3Sn$ intermetallic compounds are useful. These superconductors of the prior art are of such characteristics as shown in the following Table 1.

TABLE 1

| Superconductor | $T_c$ (° K.) | $H_c$ (kg.) at 4.2° K. | $I_c$ (a./cm.²) at 4.2° K. and in 50 kg. | $I_c$ (a./cm.²) at 4.2° K. and in 150 kg. |
|---|---|---|---|---|
| Nb-Zr alloy | 10.8 | 100 | 1×10⁵ | 0 |
| Nb-Ti alloy | 9.7 | 120 | 1×10⁵ | 0 |
| Nb₃Sn compound | 18.0 | 220 | 3.5×10⁵ | 0.8×10⁵ |

Wherein:

$T_c$ represents the critical temperature at which the material becomes superconductive.

$H_c$ represents the critical magnetic field at which the material reverts to the normal state by the application of an electric current of a very small magnitude.

$I_c$ represents the critical current density in which the material reverts to the normal state.

A superconductor which is used as a superconducting magnet wire is required to have high $T_c$, $H_c$ and $I_c$ values, especially high $H_c$ values, as well as high mechanical strength and toughness. The $Nb_3Sn$ compound shown in Table 1 is noted to be superior in its $T_c$, $H_c$ and $I_c$ characteristics to the Nb-Zr alloy and the Nb-Ti alloy, but it has relatively low mechanical strength and it is relatively brittle.

Besides the alloys mentioned above, the $V_3Ga$ compound is known as a superconducting material. Two processes for the production of superconductors are used in practice at present. One of them comprises diffusion of gallium into a substrate wire at a temperature of 1200° C. or higher, and the other comprises wire-drawing a vanadium tube which is filled with fine powder of $V_3Ga$ obtained by melting vanadium and gallium together, and sintering the $V_3Ga$ powder core contained in the resulting drawn wire at a temperature as high as 1000° C. or over. However, the superconductive characteristics represented by the values of $T_c$, $H_c$ and $I_c$ of the superconductors of the prior art containing the $V_3Ga$ compound thus obtained are considerably lower than those of the superconductors consisting of the $Nb_3Sn$ compound shown in Table 1. Furthermore, said superconductors of $V_3Ga$ of the prior art are made by a treatment involving a very high temperature in the range between 1000° C. and 1500° C., and the treatment performed at such a high temperature leads to the formation of coarse crystals of vanadium in the substrate, and this, in turn, results in the mechanical strength of the product being too low so that the product is not usable as a magnet wire.

SUMMARY OF THE INVENTION

After extensive research on vanadium-gallium system, the inventors have discovered that in the vanadium-gallium system there exist such compounds as $VGa_2$, $VGa$, $V_3Ga_2$ and $V_2Ga$, in addition to said $V_3Ga$. As a result of the study undertaken by the inventors, it has been found that, if vanadium is reacted directly with gallium, the $V_3Ga$ compound is formed when the heating temperature is as high as 1000° C. or over, although it is formed at a relatively slow formation rate. On the other hand, compound phases richer in gallium, $VGa_2$ and $V_3Ga_2$, are easily formed at relatively low temperatures and at very rapid formation rates. It has also been discovered that if compound phases richer in gallium, which phases are formed on the surface of a vanadium base material, are subjected to a subsequent heat treatment, the $V_3Ga$ compound which has excellent superconducting characteristics is formed by the reaction between the compound phases richer in gallium and the vanadium of the base material. It has been found further that compounds wherein a part of the vanadium of the $V_3Ga$ compound is substituted by at least one metal selected from the group consisting of titanium, niobium, tantalum and zirconium, and compounds wherein a part of the gallium of the $V_3Ga$ compound is substituted by at least one metal selected from the group consisting of tin, indium, arsenic, antimony, thallium and germanium, for example, such compounds as $$(V_{0.9}Ti_{0.1})_3Ga, V_3(Ga_{0.9}Sn_{0.1})$$

and $$(V_{0.9}Ti_{0.1})_3(Ga_{0.9}Sn_{0.1})$$

also exhibit superconducting characteristics similar to those possessed by the aforesaid $V_3Ga$ compound, and that these superconductors can be easily manufactured by utilizing vanadium titanium alloys or gallium-tin alloys.

The present invention is based on the knowledge obtained from the aforesaid research work.

It is an object of the present invention to provide a superconductor having excellent superconducting characteristics and having a long useful life.

It is another object of the present invention to provide a novel method for the manufacture of such excellent superconductors. The method is comprised of an ingenious combination of the following two steps: the first step, which is based on the aforesaid knowledge that the intermediate compound phases rich in gallium can be formed rapidly at a low heating temperature, involves the continuous formation of a layer of the aforesaid intermediate compound on the surface of a vanadium base material of a wire or tape form, and the second step involves a heat treatment by which said layer of intermediate compound is converted to a layer of $V_3Ga$ compound. It should be noted that the heat treatment employed in said second step in the method of the present invention is performed at a temperature considerably lower than that employed by the prior art in the heat treatment to form $V_3Ga$. The temperature range employed in the heat treatment of the second step constitutes a very important element of the present invention. The preferred temperature is in the range between 600° C. and 850° C., of which the most desirable temperature range is between 650° C. and 750° C. If the heat treatment of the prior art which employs a temperature as high as 1000° C. or over is applied to the formation of $V_3Ga$, the product will undesirably have a markedly reduced superconductivity, as will be described later.

It is a further object of the present invention to provide an improved method for the manufacture of a superconductor. This method comprises coating the surface of the gallium-rich compound phases formed in the aforesaid first process step with copper or silver before it is subjected to the heat treatment in the second step, thereby allowing the intermediate compound phases to convert more rapidly to $V_3Ga$ compound phase. In case the layer of the intermediate compound phases is coated with copper or silver before being subjected to the heat treatment in the second step, the velocity of the formation of the $V_3Ga$ compound phase increases to a great extent as compared with the case in which the intermediate compound phases are subjected to the heat treatment without being previously coated with copper or silver. More specifically, the time required for converting the copper or silver-coated intermediate compound layer on the surface of a vanadium base material into $V_3Ga$ phase having a thickness of $5\mu$ can be reduced to about one twentieth of the time required when an unocated layer of an intermediate compound is treated. It is believed that this increased rate of formation of the $V_3Ga$ phase is due to the process that the gallium atoms contained in the layer of the gallium-rich compounds formed on the surface of the vanadium base material rapidly diffuse into the layer of copper covering the external surface of said compounds, whereby the composition of the gallium-rich compound rapidly becomes that of $V_3Ga$ having a lower degree of gallium concentration. It has also been found that, during this reaction, no diffusion of copper or silver into the formed layer of $V_3Ga$ compound occurs, and that, therefore, the inherent superconducting characteristics of the $V_3Ga$ is not affected by the copper or silver coating. By substituting said vanadium base material with an alloy of vanadium and a metal selected from the group consisting of titanium, niobium, tantalum and zirconium, or by substituting the gallium bath with a bath consisting of an alloy of gallium and a metal selected from the group consisting of tin, indium, arsenic, antimony, thallium and germanium it will be possible to manufacture a superconductor consisting of a base material which is an alloy and an overlying layer consisting of one of intermetallic compounds, for example $(V, Ti)_3Ga$, $V_3(Ga, Sn)$ and $(V, Ti)_3(Ga, Sn)$. Preferably, the amount of titanium or tin to be substituted for vanadium or gallium is not in excess of 50 atomic percent. It has been confirmed by the inventors that, above this range, the superconducting characteristics of the product are greatly affected.

It is a further object of the present invention to provide an apparatus which is best suited for the manufacture of superconductors according to the aforesaid method of the present invention.

The apparatus for use in the manufacture of the superconductors according to the present invention comprises a unit for the first step process including feed reels adapted to support and move a vanadium base material, gallium bath means equipped with external heating means and provided with openings at the opposite ends thereof in the direction of movement of said vanadium base material fed therethrough, said gallium bath means being held at a temperature between 500° C. and 800° C. and adapted to form an intermediate vanadium-gallium compound phase rich in gallium on the surface of said vanadium base material coming from said feed reels by a reaction between the molten gallium contained in said bath means and said vanadium base material. A heating furnace is located on the exit side of said bath means and is provided with openings at the opposite ends in the direction of movement of said vanadium base material. The heating furnace is held at a temperature between 500° C. and 800° C. and is adapted to convert said gallium-rich compound phase, by heating said vanadium base material having an overlying intermediate gallium-rich vanadium-gallium compound phase formed by said reaction in said gallium bath means, to an intermediate vanadium-gallium compound phase richer in vanadium. A take-up reel is provided for winding thereabout the resulting intermediate product discharged from said heating furnace. A unit for the second step of the process includes a heat treatment furnace held at a temperature between 600° C. and 850° C. for effecting heat treatment of said intermediate product.

In the apparatus of the present invention, the entire unit for carrying out the first step for producing said intermediate product is placed within a closed container. The interior of said container is either evacuated or filled with an inert gas. By employing the intermediate product manufacturing unit of the aforesaid arrangement in order to carry out the first step, the produced intermediate compound phases rich in gallium are prevented from being contaminated by the external atmosphere. As a consequence, this unit permits a further improvement in the properties of the superconductor which is the final product. It is preferred that the unit for carrying out the second step is also enclosed in a closed container which is either evacuated or filled with an inert gas in a manner similar to that for the unit for carrying out the first step. Such an arrangement will allow the product to be protected from the risk of being contaminated by the external atmosphere and, as a result, there will occur no deterioration of the superconductive characteristics of the final product. The preferred degree of vacuum produced in the closed containers provided in the units of the first and the second steps is $1 \times 10^{-2}$ mm. Hg or higher.

The apparatus of the present invention may be provided further, between said unit for the first step and said unit for the second step, with intermediate means for applying a copper or silver coating onto the surface of the intermediate vanadium-gallium compound phases formed in the first step, and this constitutes one of the features of the present invention. Said intermediate means preferably comprises an electroplating means for plating said intermediate product with a layer of copper or silver by utilizing any known electroplating technique, or a means adapted to apply a foil of copper or silver around the intermediate product. It should be understood, however, that the intermediate means is not restricted to only such ones as have been mentioned above, but any appropriate means may be employed provided that it is adapted to coat the surface of the intermediate vanadium-gallium compound phases with copper or silver, since such coating serves to accelerate the formation of the $V_3Ga$ compound in the second step. For example, said copper or silver coating may be produced by a known evaporation technique. It should also be understood by those skilled in the art that said intermediate means may be located inside the unit for carrying out the first step.

The gallium bath container for the gallium bath means used in the unit for the first step is made of quartz or a metal which does not react with gallium. In case the vanadium base material to be treated is in a wire form, the gallium bath means preferably is of the so-called multiple stage type which comprises at least two vertically arranged crucibles each having a small opening at the bottom. In case the vanadium base material is in a tape form, the gallium bath container is preferably of a hollow U-shape. However, both of these types of bath containers may be used for treating the vanadium base material irrespective of whether it is in the wire or the tape form. In case a vanadium base material of one of the aforesaid forms is passed through such a gallium bath means of a substantial length, the base material is immersed in the gallium bath for a considerably long period of time. Therefore, even when the speed of travel of the base material through the bath is increased, the satisfactory formation of a desired amount of gallium-rich compound, such as $VGa_2$, on the surface of the base material is not hampered, and the formation of a layer of gallium-rich compound of uniform thickness is not affected. As a result, the efficiency of the manufacturing operation will be enhanced. The heating furnace for forming the intermediate compound phases provided in the unit for the first step is preferably of a type comprising, for example, a pipe heater having openings at the opposite ends so that the base material may be passed therethrough.

The heat treatment employed in the second step of the present invention may be performed by subjecting the intermediate product formed in the first step and wound around a reel to heat treatment, or by continuously feeding the intermediate product through a heating furnace of either the vertical or the horizontal type. In case the heat treatment is performed in the former manner, the object of the heat treatment can be fully attained by the use of an electric furnace of a known closed type. In case the vanadium base material having a layer of gallium-rich compound formed thereon is provided with a coating of copper or silver thereabove, such base material wound around a reel may also be placed in an electric furnace of a similar closed type. Such electric furnace of the closed type preferably is of a structure, comprising, for example, an exhaust outlet equipped with valve means for producing a vacuum there-within an inlet equipped with valve means for the introduction of an inert gas, an inlet equipped with a cover for the supply of the material to be heat treated, heating means located above said material supply inlet, and a material-holding tray supported by a rod adapted to move vertically through the bottom wall of the furnace so that the material placed on the tray may be displaced toward the heating means or away therefrom.

As has been described above, according to the present invention, there is obtained a superconductor having formed on the surface of a vanadium base material, a layer consisting of a substantially pure $V_3Ga$ compound and exhibiting excellent superconducting characteristics, with an $H_c$ of 245 kg. (4.2° K.) or higher, an $I_c$ of $3 \times 10^5$ (A./cm.$^2$) (at 4.2° K., 50 kg.) or higher, and a $T_c$ of 15.0° K., or over, and a novel method for the manufacture of such superconductor, and also an apparatus which is best suited for putting such method into practice. Thus, the present invention contributes a great deal in this field of art. In view of the remarkable feature that the superconductor of the present invention is manufactured by means of a heat treatment which is conducted at a low temperature around 700° C., the product is of a highly increased toughness, and is most suitable for use as magnet wires.

BRIEF DESCRIPTION OF THE DRAWING

In FIG. 2, reference numeral 1 represents a supply reel; numeral 2 represents a vanadium base material; numeral 3 represents feeding reels; numeral 4 represents gallium bath means; numeral 4' represents heating means; numeral 5 represents a heating furnace; numeral 6 represents a roller; numeral 7 represents a take-up reel; numeral 8 represents an inlet for an inert gas; numeral 9 represents an outlet for exhausting the inert gas; numeral 10 represents an exhaust outlet for producing vacuum and numeral 11 represents a closed container. An electric current is passed between the roller 6 and the take-up reel 7 so that the intermediate product per se is caused to generate Joule's heat.

In FIG. 3, reference numeral 18 represents a supply reel; numeral 12 represents a vanadium base material; numeral 13 represents feeding reels; numeral 14 represents a gallium bath means; numeral 14' represents a heating means; numeral 15 represents a heating furnace; numeral 16 represents a take-up reel; numeral 17 represents an exhaust outlet for producing vacuum and numeral 19 represents a closed container.

FIG. 4(a') and FIG. 4(b') are fragmental transverse cross sections of the final products obtained from these intermediate products according to the present invention. FIG. 4(a) is a representation of an intermediate product having no copper coating formed thereon. FIG. 4(b) is a fragmental representation of an intermediate product having a copper coating formed on the surface thereof. FIG. 4(a') and FIG. 4(b') are fragmental representations of the transverse cross sections of the final products obtained by heating the aforesaid intermediate products of FIG. 4(a) and FIG. 4(b), respectively. In these drawings of the cross sections, reference numeral 21 represents a vanadium base material; numeral 22 represents a layer of intermediate compound phases rich in gallium; numeral 23 represents a $V_3Ga$ compound phase; numeral 24 represent a layer of copper, and numeral 25 represents a layer of copper-gallium-vanadium alloy formed by the reaction between the layer 22 and the layer 24, and these drawings illustrate, for the convenience of understanding, the manner in which the intermediate compound phases located on the surface of the vanadium base material transform into the $V_3Ga$ phase in the second step of the present invention.

In FIG. 5, the symbol (a) indicates a curve showing the changes in the thickness of the layer of the $V_3Ga$ compound phase when the layer of the intermediate compound was not provided with a copper coating. The symbol (b) indicates a curve showing the similar changes where the intermediate product was provided with a copper coating.

In FIG. 6, the symbol (a) indicates the curve showing the changes in $I_c(A.)$ of the final product of the present invention which has a cross sectional diameter of 0.4 mm. and which is obtained by subjecting the intermediate product having no copper coating to heat treatment at said temperatures. The symbol (b) represents a curve showing the changes in $I_c(A)$ of the final product of the present invention having the same cross sectional diameter and which is obtained by subjecting the intermediate product provided with a copper coating to heat treatment in the same manner.

In FIG. 7, curve 1 represents the changes in the $I_c$ value of the product of the present invention with the magnetic fields transversely applied thereto; curve 2 represents the same of the conventional $Nb_3Sn$ product, and curve 3 represents the same of the conventional $V_3Ga$ product.

DESCRIPTION OF THE PREFERRED EMBODIMENTS

Example 1

Figure 1:
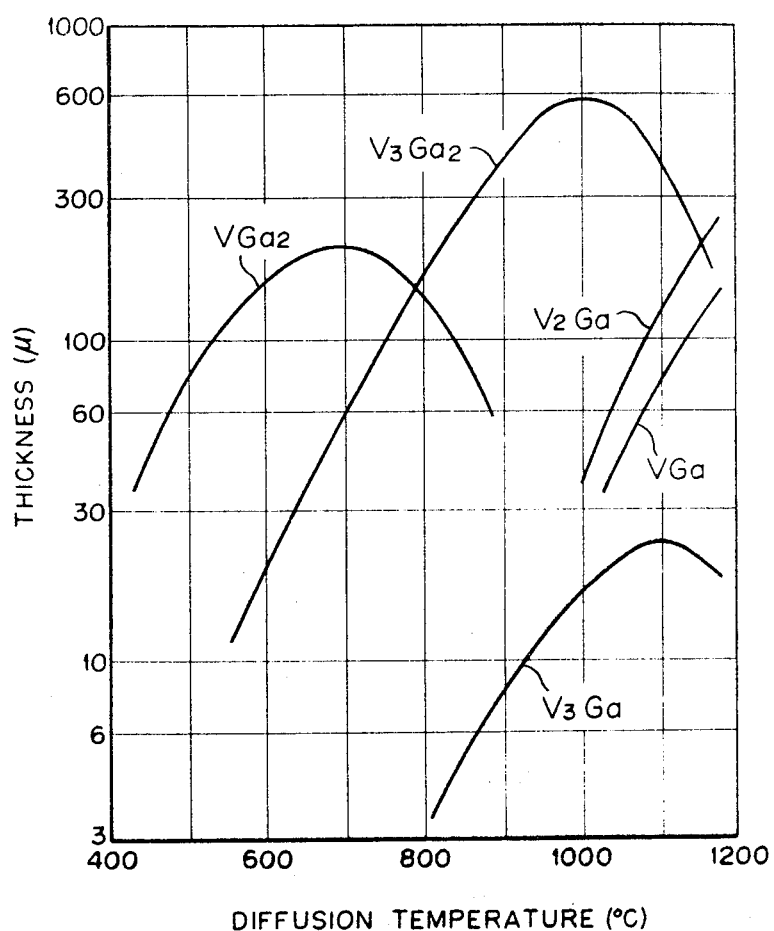
FIG. 1 is a graph showing the relationship between the temperature for forming vanadium-gallium compounds and the thicknesses of the respective compound layers. On the vertical axis of this graph are plotted the thicknesses of the intermediate compound phases obtained by diffusing molten gallium into the vanadium base material by heat treatment for predetermined lengths of time at the temperatures shown by the graduations provided on the horizontal axis.
Figure 2:
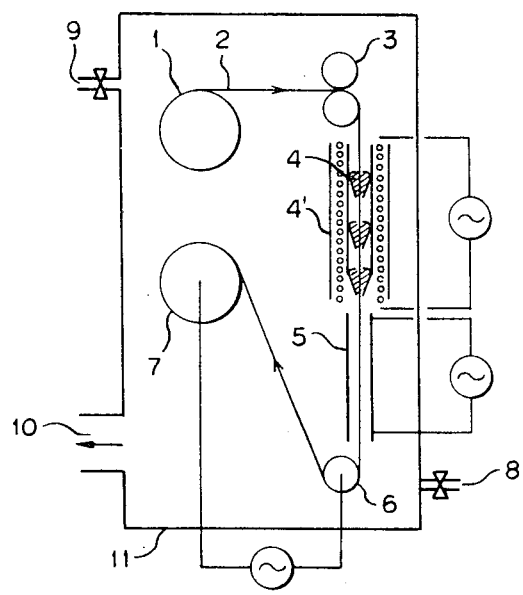
FIG. 2 is a schematic representation of one embodiment of the apparatus of the present invention suitable for the manufacture of said intermediate superconductor product, wherein gallium bath means comprises three crucible-like bath vessels arranged vertically.

Using a unit of the type as shown in FIG. 2 for the manufacture of an intermediate product in the first step of the process and also an electric furnace for heat treatment conducted in the second step of the process, a superconductor was produced from a vanadium base material of a wire form having a cross sectional diameter of 0.38 mm. In the manufacture of said superconductor, the gallium bath means 4 made of quartz crucibles and the pipe heater 5 were held at 700° C., respectively. The depth of the molten gallium contained in each bath container was about 15 mm. After rendering the unit to a viscous state of $5 \times 10^{-5}$ mm. Hg in the closed container 11 by exhausting the air therefrom through the exhaust outlet 10 by means of a suction pump, the supply reel 1 was rotated by a motor to drive said vanadium base material at the speed of 300 mm. per minute. At the same time, an electric current was passed between the roller 6 and the take-up reel 7 so that the intermediate product was caused to generate Joule's heat. As a result, an intermediate product having a cross sectional diameter of 0.4 mm. and having, on the surface of the vanadium base material, a layer of vanadium-gallium compounds rich in gallium with a thickness of 10$\mu$ was obtained.

Figure 4A:
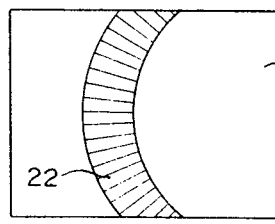
FIG. 4(a) and FIG. 4(b) are fragmental transverse cross sections of intermediate products of two different types obtained according to the present invention.
Figure 4A:
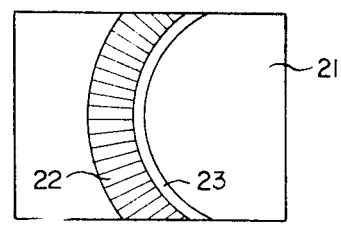

The obtained intermediate product wound around a take-up reel 7 was withdrawn from the intermediate product manufacturing unit and was placed in an electric furnace held at 700° C. and was heat treated therein for about 50 hours. As a result, a superconducting product having a layer of $V_3Ga$ compound with a thickness of about 4$\mu$ formed at the plane of contact between the layer of compounds rich in gallium and the vanadium base material as shown in FIG. 4(a) and FIG. 4(a') was obtained. The aforesaid intermediate product was then cut into eight equal length pieces. They were then placed in electric furnaces held at 650° C., 700° C., 750° C., 850° C., 900° C., 1000° C., 1050° C. and 1150° C., respectively, for being heat treated therein for about 100 hours. The resulting products were determined of their critical current values at 4.2° K. by applying thereto a transverse magnetic field of 30 kg., and as a result, the curve (a) in FIG. 6 was obtained. Furthermore, the thickness of the formed layers of the $V_3Ga$ compound in these samples which were heat treated at a constant temperature of 700° C. for different lengths of time ranging from 5 hours to 100 hours, were measured, and thus the curve (a) in FIG. 5 was obtained. In the heat treatment of the second step of the process of this example a critical current of an extremely great magnitude was obtained from the heating in the vicinity of 700° C. Likewise, the superconducting transition temperature $T_c$ also showed a maximum value of 15.1° K. by the heating in the vicinity of 700° C. It was found that this value decreased gradually when the heating temperature was higher than this level and the $T_c$ value dropped to 13.8° K., when the temperature of the heat treatment was 1200° C.

Example 2

Figure 3:
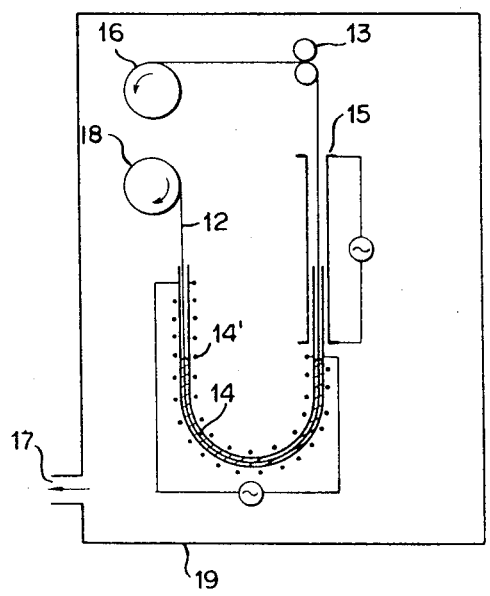
FIG. 3 is a flow sheet showing another embodiment of the apparatus for manufacturing the intermediate product according to the present invention, wherein a U-shaped gallium bath means is provided.

Using the intermediate product manufacturing unit shown in FIG. 3 for the first step of the process, an ordinary copper plating electrolytic cell for coating the intermediate product with a layer of copper and also an electric furnace for heat treatment of the second step process, a superconductor with a wireform vanadium base material having a cross sectional diameter of 0.38 mm. was manufactured.

Figure 4B:
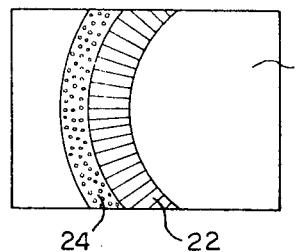
Figure 4B:
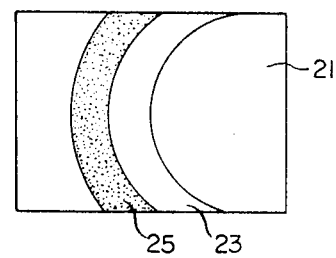
Figure 5:
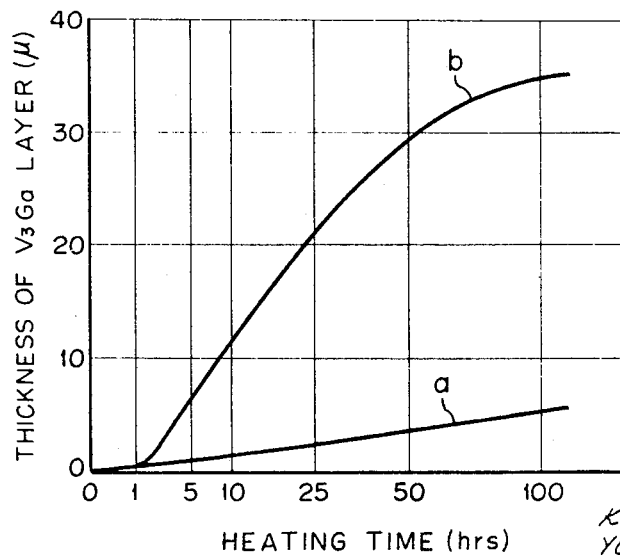
FIG. 5 is a graph showing the manner in which the thickness of the layer of the $V_3Ga$ compound phase varies with the duration of the heat treatment at 700° C. in cases where the intermediate products obtained according to the present invention have and do not have, respectively, a copper coating on the surface.

As a preparatory step, the gallium bath 14 of a length of about 100 mm. contained in a U-shaped pipe crucible made of quartz and a pipe heater 15 were both held at 700° C., while exhausting the air from the container through an exhausting outlet 17 by means of a suction pump. The subsequent operation was conducted in a manner similar to that described in connection with Example 1. As a result, an intermediate product having a cross sectional diameter of 0.4 mm. and having a layer of compounds rich in gallium with a thickness of 10$\mu$ formed on the surface of the vanadium base material was obtained. Then, this intermediate product was withdrawn from the reel 16 and passed through an electrolytic plating cell (the plating bath consisted of copper sulfate or copper fluoboride). With the electrolyzing current density of 20 A./dm.$^2$, a copper layer, about 10$\mu$ in thickness was plated on the intermediate product after electrolyzing for about 2 minutes. The resulting product was washed with water and was again wound about a reel. This reel was placed in an electric furnace held at 700° C. for the purpose of heat treatment. In this manner, a superconductor product having a cross section as shown in FIG. 4(b) and FIG. 4(b') was obtained. The products which had been heat treated for different lengths of time ranging from 5 hours to 100 hours were withdrawn from the electric furnaces during the course of their heat treatment. The thicknesses of the layers of the $V_3Ga$ compound formed in these products were measured, and the curve (b) in FIG. 5 was obtained. Furthermore, nine pieces of wires were prepared by cutting the aforesaid intermediate product coated with a layer of copper of 10$\mu$ thick into nine pieces of appropriate lengths, and they were placed in an electric furnace for heat treatment at different degrees of temperature ranging from 550° C. to 1050° C. in a manner similar to that described in connection with Example 1 for 10 hours. The resulting samples of products were tested to determine their superconducting critical current vlaues at 4.2° K. by applying thereto a transverse magnetic field of 30 kg.

Figure 6:
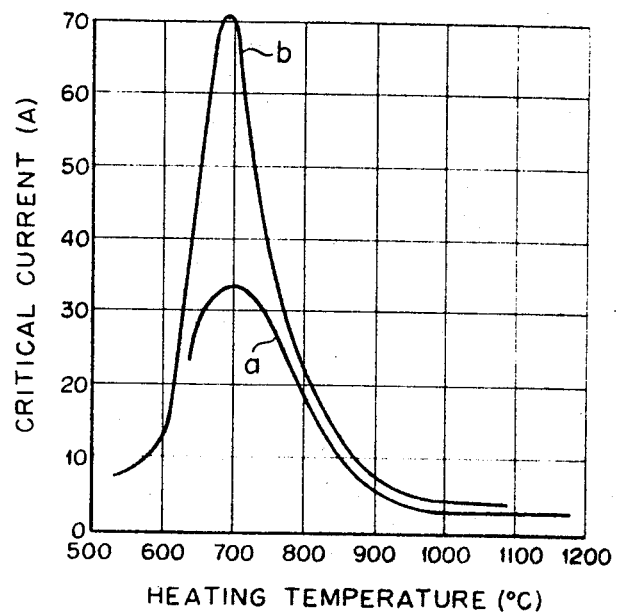
FIG. 6 is a graph showing the changes in the values of the critical current $I_c(A.)$ of the following two types of final products measured at 4.2° K. when a magnetic field of 30 kg. is applied thereto transversely, said two types of final products having been obtained by subjecting two kinds of intermediate products, one of which is coated with a layer of copper and the other one is without a copper coating, to heat treatment at a temperature between 500° C. and 1200° C., respectively.

Thus, the curve (b) in FIG. 6 was obtained. From the curve (b) in FIG. 6, it is noted that the heat treatment temperature which is best suited for the manufacture of an excellent superconductor is about 700° C., as in the instance of Example 1. The reason why, in FIG. 6, the superconductors in Example 2 exhibit $I_c$ values greater than those in Example 1 is explained by the fact that those products obtained in Example 2 were manufactured by coating the intermediate products with a layer of copper before they were subjected to heat treatment and this resulted in the formation of a thicker $V_3Ga$ phase on the surface of the products of Example 2 than that of Example 1. However, both of the superconductors obtained in Example 1 and Example 2 heat treated at the same temperature showed $T_c$ values which were substantially identical to each other. The critical magnetic field, i.e., the point at which the superconductivity of a superconductor is lost by the action of the applied magnetic field when a current of a very small magnitude is applied to the superconductor, and the value of the so-called critical current, i.e., the magnitude of the applied current by which the superconductivity of a superconductor product is lost, were determined on those products of the present invention which had been heat treated at 700° C. for 10 hours, and the results were compared with those values of the conventional wire-form superconductors consisting of $V_3Ga$ compound manufactured through heat treatment at 1200° C. for 20 hours.

The results are as shown in the following Table 2.

TABLE 2

| Superconductor | $H_c$ (kg.) at 4.2° K. | $I_c$ (a./cm.$^2$) at 4.2° K. in 50 kg. | $I_c$ (a./cm.$^2$) at 4.2° K. in 150 kg. |
|---|---|---|---|
| Conventional | 185 | $1.5 \times 10^4$ | $2 \times 10^4$ |
| Present invention | 245 | $3.0 \times 10^5$ | $1 \times 10^5$ |

From Table 2, it is clearly noted that the product of the present invention is markedly superior to the conventional product in its $H_c$ characteristic which is the most important property required of superconducting magnet wires. It is also noted that the superconductor of the present invention has $I_c$ values which are about one order greater than that of the conventional superconductor. Likewise, by referring to Table 1, it is noted that the product of the present invention has an $H_c$ value which is superior to that of the $Nb_3Sn$ compound of the prior art. Furthermore, the mechanical tensile strengths were measured on the superconductor of the present invention, the conventional $V_3Ga$ superconductor and also on the conventional $Nb_3Sn$ superconductor, respectively. The results are shown in Table 3.

TABLE 3

| Superconductor: | Tensile strength (kg./mm.$^2$) |
|---|---|
| Conventional ($V_3Ga$ superconductor) | Approximately 20. |
| Present invention | Approximately 50. |
| Conventional ($Nb_3Sn$ superconductor) | Approximately 30. |

As is clear from Table 3, in the comparison of the superconductor of the present invention with those of the prior art, it is also noted that the former is much superior in mechanical strength which is also an important property required of superconducting magnet wires.

Figure 7:
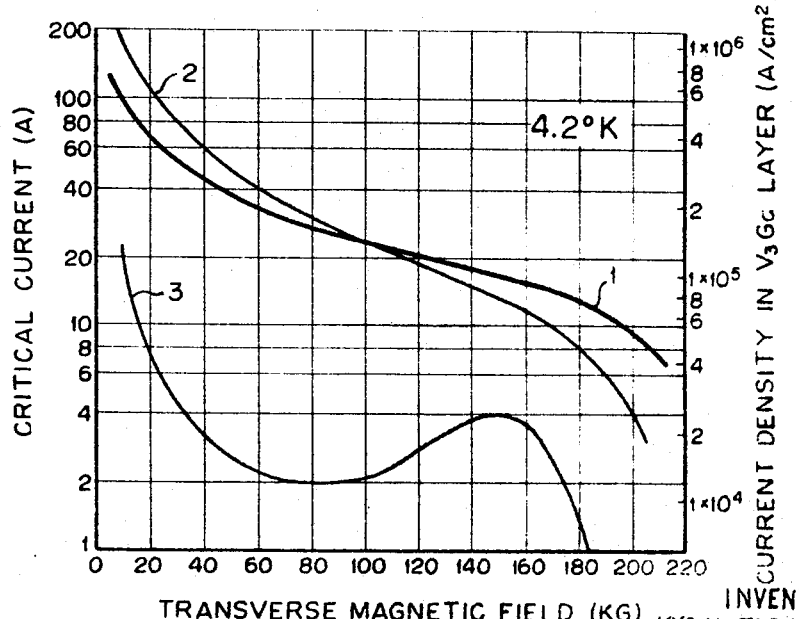
FIG. 7 is a comparative graph containing curves showing the difference in the values of the critical current $I_c$ (A.) at 4.2° K. between the final product of the present invention, the conventional $Nb_3Sn$ product and the conventional $V_3Ga$ product prepared by heat treatment conducted at 1200° C. for 20 hours, all of which are identical in the area of the superconducting compound layer when transverse magnetic fields of different magnitudes are applied thereto. The graph is provided, on the right-side vertical axis, with additional graduations showing the values of critical current expressed in current density (A./cm.$^2$).

By measuring the values of the critical current exhibited by the respective superconductors shown in Table 3 at 4.2° K. when magnetic fields of various magnitudes ranging from 10 kg. to 210 kg. were applied transversely thereto, the critical current versus the applied magnetic field curves in FIG. 7 were obtained. From FIG. 7, it is noted that the superconductors of the present invention retain a critical current density of $5 \times 10^4$ (a./cm.$^2$) which is the value required of superconducting magnet wires for practical use till the magnitude of the applied magnetic field reaches as high a level as 200 kg.

It is also noted that, when the magnitude of the applied magnetic field is as high as 100 kg. or greater, the superconductors of the present invention exhibit a property which is superior to that of the superconductors of the prior art consisting of $Nb_3Sn$ compound which have been accepted, up to the present, as having the most superior characteristics. Specifically, the products of the present invention can be used till the magnitude of the applied magnetic field reaches as high a level as 200 kg. In other words, it has been confirmed by the inventors that the superconductors of the present invention are ones which are able to generate extremely high magnetic fields which the conventional superconductors have failed to attain in their superconducting state.

The method and the apparatus of the present invention which have been described above should be equally applicable to superconductors other than $V_3Ga$, such as $Nb_3Ga$, $Nb_3Al$ and $Nb_3In$.

What we claim is:

1. A method of producing a superconductor, which comprises:
    (A) passing an elongated base consisting of (1) a vanadium material selected from the group consisting of (a) vanadium metal and (b) an alloy containing a major amount of vanadium and the balance consisting essentially of at least one metal selected from the group consisting of titanium, niobium, tantalum and zirconium, through (2) molten gallium material, at a temperature in the range of 500° C. and 800° C., to form on said base a layer of vanadium-gallium compounds, said gallium material being selected from the group consisting of (a) gallium metal and (b) an alloy containing a major amount of gallium and the balance consisting essentially of at least one metal selected from the group consisting of tin, indium, arsenic, antimony, thallium and germanium;
    (B) coating said layer of vanadium-gallium compounds with a covering layer of at least one metal selected from the group consisting of copper and silver; and
    (C) heating the product of step (B) at a temperature in the range of 600° C. to 850° C. to convert said layer of vanadium-gallium compounds into a layer consisting of (vanadium material)$_3$-(gallium material)$_1$ compound.

2. A method for manufacturing a superconductor according to claim 1, wherein said step (A) is performed in a vacuum.

3. A method for manufacturing a superconductor according to claim 1, wherein said step (A) is performed in an inert gas atmosphere.

4. A method for manufacturing a superconductor according to claim 1 wherein said step (B) is performed in a vacuum.

5. A method for manufacturing a superconductor according to claim 1, wherein said step (B) is performed in an inert gas atmosphere.

References Cited

UNITED STATES PATENTS

| 3,252,832 | 5/1966 | Saur | 117—231 X |
| 3,346,467 | 10/1967 | Allen | 29—599 X |
| 3,397,084 | 8/1968 | Krieglstein | 117—217 |
| 3,395,000 | 7/1968 | Hanak et al. | 117—217 X |

ALFRED L. LEAVITT, Primary Examiner

C. K. WEIFFENBACH, Assistant Examiner

U.S. Cl. X.R.

29—599; 117—62, 230, 231, 227